United States Patent [19]

Shiobara et al.

[11] Patent Number: 5,070,154

[45] Date of Patent: Dec. 3, 1991

[54] COMPOSITION OF MALEIMIDE AND AROMATIC-DOUBLE BOND EPOXY RESIN

[75] Inventors: Toshio Shiobara; Hisashi Simizu, both of Annaka, Japan

[73] Assignee: Shin-Etsu Chemical Co., Ltd., Tokyo, Japan

[21] Appl. No.: 580,647

[22] Filed: Sep. 11, 1990

[30] Foreign Application Priority Data

Sep. 11, 1989 [JP] Japan .................................. 1-235306

[51] Int. Cl.$^5$ ...................... C08L 63/04; C08L 63/10; C08L 79/08
[52] U.S. Cl. ..................................... 525/422; 525/502
[58] Field of Search ................. 525/502, 422; 528/101

[56] References Cited

U.S. PATENT DOCUMENTS 4,130,600 12/1978 Zahir et al. ...................... 525/504
4,384,129 5/1983 Zahir et al. ...................... 528/101
4,525,572 6/1985 Dicthelm et al. .................. 528/101
4,851,483 7/1989 Hefner, Jr. et al. ................ 525/502
4,945,138 7/1990 Hefner, Jr. et al. ................ 525/502

FOREIGN PATENT DOCUMENTS 0225174 6/1987 European Pat. Off. .
52-994 1/1977 Japan .

*Primary Examiner*—John C. Bleutge
*Assistant Examiner*—Robert E. L. Sellers, II
*Attorney, Agent, or Firm*—Birch, Stewart, Kolasch & Birch

[57] ABSTRACT

A thermosetting resin composition comprising a maleimide compound having in the molecule thereof, at least one N-substituted maleimide group and an epoxy resin having a double bond conjugated with an aromatic ring is easily workable and which yields cured products having improved heat resistance.

13 Claims, No Drawings

COMPOSITION OF MALEIMIDE AND AROMATIC-DOUBLE BOND EPOXY RESIN

FIELD OF THE INVENTION

The present invention relates to thermosetting resin compositions having improved workability and heat resistance.

BACKGROUND OF THE INVENTION

Thermosetting resins have been widely used as various electrical insulating materials, structural materials, adhesives and the like using casting, impregnating, laminating, and molding techniques. In recent years, more severe requirements have been imposed on the materials used in these applications. Inter alia, heat resistance is an important requirement.

Thermosetting polyimide resins generally used as thermosetting resin are quire resistant against heat, but poor in processing, since they must be heated at high temperatures for a long period of time upon working. In turn, epoxy resins modified for heat resistance improvements are easy to process, but insufficient in mechanical properties at high temperatures, electrical properties, long-term thermal degradation resistance, and heavy-duty heat resistance.

Several replacements for these thermosetting resins are known, for example, a thermosetting mixture containing a polyimide and an alkenylphenol or alkenylphenol ether (see Japanese Patent Application Kokai No. 994/1977), and a heat resistant resin composition containing a maleimide compound, a poly(allylated phenol) compound and an epoxy resin (see Japanese Patent Application Kokai No. 184099/1983). The poly(allylated phenol) compounds used in these compositions have a nuclearly substituting allyl group and a hydroxyl or ether group attached to a common aromatic ring at the ortho position because they result from Claisen rearrangement of a poly(allyl ether) compound or these compounds have the structure that a phenolic hydroxyl group has that is generated through Claisen rearrangement during thermosetting. Therefore, they tend to remain unreacted particularly in resin compositions of the novolak type, which leaves problems with regard to setting properties and thermal degradation resistance at high temperatures.

SUMMARY OF THE INVENTION

Therefore, an object of the present invention is to provide a thermosetting resin composition which is easy to process and cures into products having improved heat resistance.

According to the present invention, there is provided a thermosetting resin composition comprising in admixture, (a) a maleimide compound having at least one N-substituted maleimide group in its molecule and (b) an epoxy resin having a double bond conjugated with an aromatic ring.

This thermosetting resin composition is readily workable with low stresses and is and highly bondable, and the cured products therefrom have excellent heat resistance including good mechanical strength at high temperatures and hot water resistance.

In general, compounds having an N-substituted maleimide group are greatly effective to in imparting heat resistance, but thermosetting resin compositions having such compounds blended therein are unsatisfactory in long-term heat resistance, adhesion and workability. Quite unexpectedly, by using a maleimide group-containing compound having a structural unit of formula (I) in combination with an epoxy resin having a double bond conjugated with an aromatic ring, whereby a vinyl group of the maleimide group-containing compound reacts with a vinyl group of the epoxy resin having conjugated double bonds to form a copolymer, there can be obtained cured products which are improved in long-term heat resistance, adhesion and the like.

DETAILED DESCRIPTION OF THE INVENTION

The thermosetting resin composition of the present invention includes (a) a maleimide compound having in the molecule thereof, at least one N-substituted maleimide group.

Preferred are maleimides of the following formula (I):

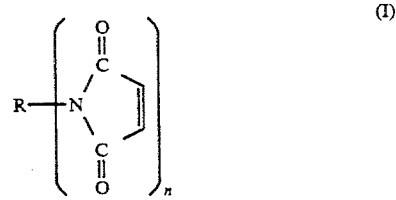

In formula (I), substituent R is an n-valent organic group and letter n is an integer of from 1 to 20, preferably from 1 to 6, more preferably 2. In the case of n=2, the divalent organic groups represented by R include a halogen-substituted or unsubstituted divalent aliphatic hydrocarbon group having 1 to 15 carbon atoms, a halogen-substituted or unsubstituted divalent aromatic hydrocarbon group having 6 to 20 carbon atoms, a halogen-substituted or unsubstituted alkylene arylene group consisting of these two, and these organic groups partially having a functional group such as ether, thioether, sulfoxide, and sulfone. Examples of substituent R are shown below.

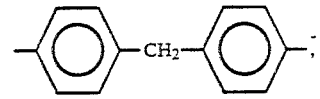

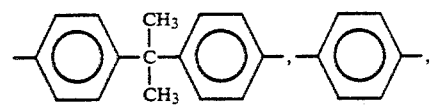

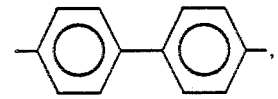

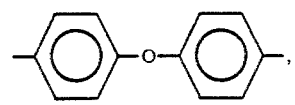

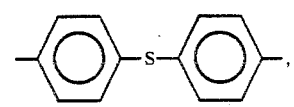

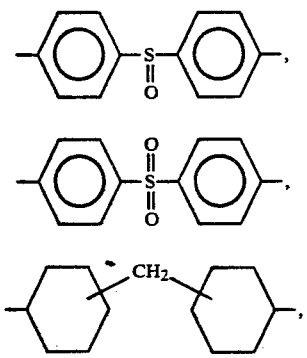

N,N'-diphenylcyclohexane bismaleimide,
N,N'-dichlorodiphenyl bismaleimide,
N,N'-(2,2-diphenylpropane) bismaleimide,
N,N'-diphenyl ether bismaleimide,
N,N'-diphenyl sulfone bismaleimide,
N,N'-ethylene bismaleimide,
N,N'-hexamethylene bismaleimide,
N,N'-(dimethylhexamethylene) bismaleimide, etc.; prepolymers obtained by adding diamines to these N,N'-bismaleimides, the prepolymers being terminated with an N,N'-bismaleimide skeleton; and maleimide derivatives of aniline and formalin condensates.

Other useful maleimide compounds are compounds of the following formula:

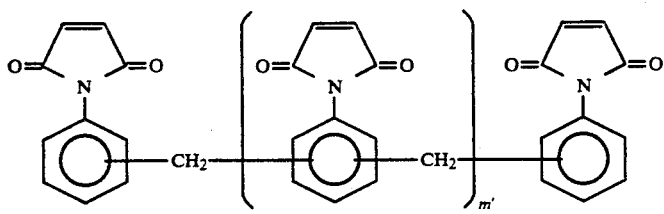

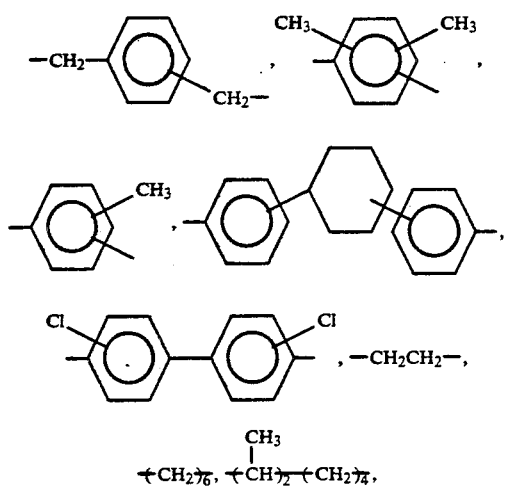

wherein m' is an integer of 0 to 18, and mixture of an N-substituted monomaleimide, N-substituted trimaleimide or N-substituted tetramaleimide, and an N-substituted bismaleimide. Maleimide compounds as mentioned above, but modified with silicones are also useful.

In the practice of the present invention, these maleimides may be used alone or in an admixture of two or more. Among others, tri-substituted maleimides and substituted bismaleimides, especially N,N'-diphenylmethane bismaleimide are preferred.

The thermosetting resin composition of the present invention also includes (b) an epoxy resin having a double bond conjugated with an aromatic ring. The epoxy resin as component (b) is essentially free of a silicon atom in its molecule and has a double bond conjugated with an aromatic ring as represented by the following formula:

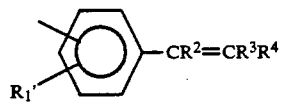

In the last appearing formula, R' is a hydrogen atom, a C$_{1-4}$ alkyl group or a halogen atom, and m is an integer of from 0 to 18.

Several illustrative, non-limiting examples of the compounds having an N-substituted maleimide group include N,N'-bismaleimides such as
N,N'-diphenylmethane bismaleimide,
N,N'-phenylene bismaleimide,
N,N'-diphenyl ether bismaleimide,
N,N'-diphenyl sulfone bismaleimide,
N,N'-dicyclohexylmethane bismaleimide,
N,N'-xylene bismaleimide,
N,N'-tolylene bismaleimide,
N,N'-xylylene bismaleimide, wherein R' is a hydrogen atom, a halogen atom, a halogen-substituted or unsubstituted alkyl group having 1 to 6 carbon atoms or a glycidoxy group, R$^2$, R$^3$ and R$^4$ are independently selected from a hydrogen atom and an alkyl group having 1 to 4 carbon atoms, and letter l is an integer of 1 to 3, for example, such as

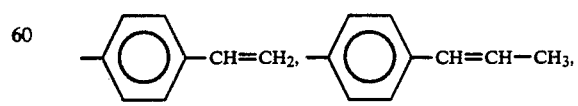

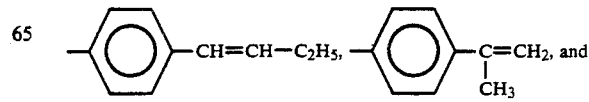

-continued
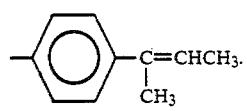
Illustrative of the epoxy resin are compounds of the following formulae (1) through (7).
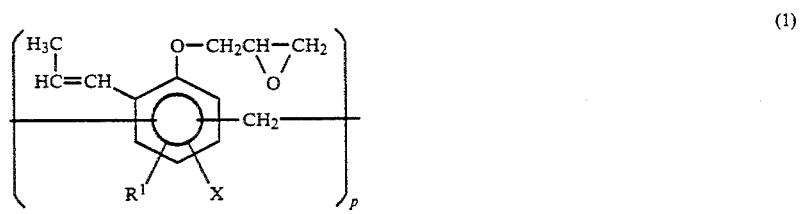
(1)
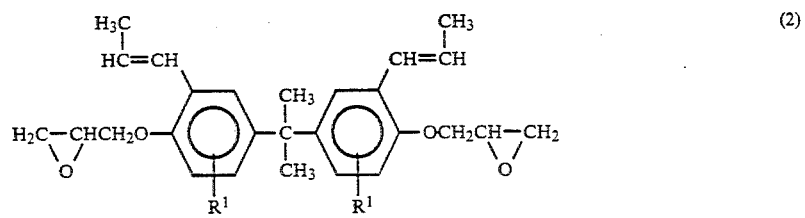
(2)
(3)
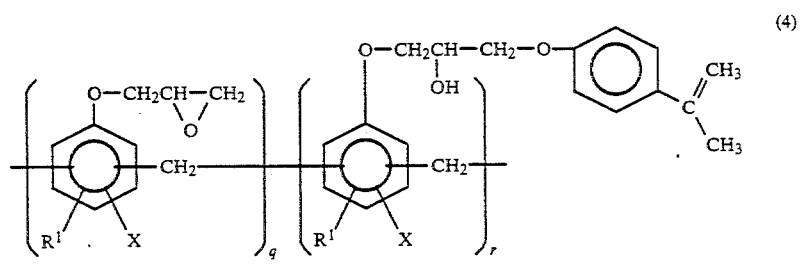
(4)
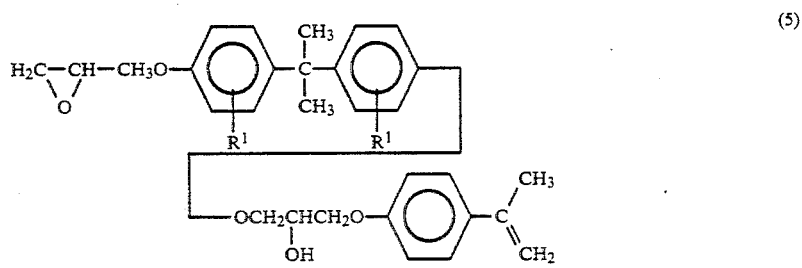
(5)
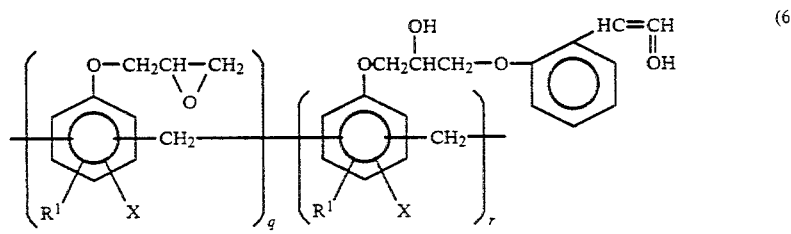
(6)

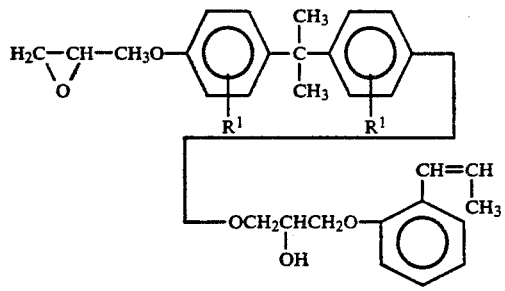

(7)

In the foregoing formulae, $R^1$ is a hydrogen atom or a monovalent hydrocarbon group having 1 to 6 carbon atoms, especially an alkyl group, X is a hydrogen atom or halogen atom, and p, q and r are positive integers of from 1 to 20, preferably from 2 to 10, and q+r is equal to an integer of from 2 to 20, preferably from 2 to 10.

The epoxy resins having conjugated double bonds may be used alone or in an admixture of two or more.

These epoxy resins having a double bond conjugated with an aromatic ring, are easily prepared by any conventional synthetic methods, typically by epoxidizing a phenolic resin having conjugated double bonds with epichlorohydrin or by partially reacting 2-propenyl-phenol or a similar reactant with any of the well-known epoxy resins. The well-known epoxy resins used for synthesis are epoxy resins having at least two epoxy groups per molecule. The molecular structures and molecular weights thereof are not critical. Included are epoxy resins synthesized from epichlorohydrin and various novolak resins on bisphenols, cycloaliphatic epoxy resin, epoxy resins having a halogen, such as chlorine and bromine incorporated therein, and epoxidized triphenol methane.

In the practice of the present invention, functional ratio B/A is preferably from 15/10 to 4/10, more preferably 7/10 to 6/10, wherein A is the quantity of vinyl group in the maleimide or component (a) and B is the quantity of vinyl group in the epoxy resin having a double bond conjugated with an aromatic ring or component (b). If functional ratio B/A is higher than 15/10, this would mean that the proportion of the vinyl group associated with the epoxy resin is too large, and that more reactants would remain unreacted, giving rise to a curing problem and further, that the cured products might have poor long-term heat resistance and reliability. If functional ratio B/A is lower than 4/10, this would mean that the proportion of the vinyl group associated with the epoxy resin is too small, and that there would be problems created in the molding and mechanical strength.

In the practice of the present invention, the maleimide or component (a) and the epoxy resin having a double bond conjugated with an aromatic ring or component (b) are blended in such amounts that the composition contains 100 parts by weight of component (a) and 20 to 400 parts by weight, especially 50 to 200 parts of component (b). If component (b) is less than 20 parts by weight, the resulting composition would become less moldable or workable and cure into less heat resistant products. If component (b) exceeds 400 parts by weight, the composition would lower its glass transition temperature and long-term heat resistance due to a lesser proportion of the maleimide component.

In the practice of the present invention, a catalyst is preferably blended in the composition in a catalytic amount to insure complete crosslinking bond between the compound having an N-substituted maleimide group of formula (I) and the epoxy resin having a double bond conjugated with an aromatic ring. The catalysts are typically organic peroxides, for example, such as benzoyl peroxide, parachlorobenzoyl peroxide, 2,4-dichlorobenzoyl peroxide, capryl peroxide, lauroyl peroxide, acetyl peroxide, methyl ethyl ketone peroxide, cyclohexanone peroxide, bis(1-hydroxycyclohexyl peroxide), hydroxyheptyl peroxide, tert.-butyl hydroperoxide, p-methane hydroperoxide, cumene hydroperoxide, di-tert.-butyl peroxide, dicumyl peroxide, 2,5-dimethyl-2,5-di(tert.-butyl peroxide) hexane, 2,5-dimethylhexyl-2,5-di(peroxybenzoate), tert.-butyl perbenzoate, tert.-butyl peracetate, tert.-butyl peroctoate, tert.-butyl peroxyisobutyrate, and di-tert.-butyl-diperphthalate alone and mixtures thereof. Co-catalysts, for example, imidazole and its derivative, tertiary amine derivatives, phosphine derivatives, and cycloamidine derivatives may be used in combination with the catalyst.

The catalytic amount is preferably selected such that there if 0.01 to 10 parts by weight, more preferably 0.1 to 2 parts by weight of the catalyst per 100 parts by weight of components (a) and (b). Less than 0.01 part of the catalyst is insufficient for catalysis, whereas more than 10 parts of the catalyst promotes premature curing for molding.

In the practice of the present invention, a curing agent is preferably blended in the composition. Examples of the curing agent include amine curing agents such as diaminodiphenylmethane, diaminodiphenylsulfone, and meta-phenylenediamine; acid anhydride curing agents such as phthalic anhydride, pyromellitic anhydride, benzophenone tetracarboxylic anhydride; and phenol novolak curing agents having two or more hydroxyl groups in a molecule such as phenol novolak and cresol novolak. One or more curing agents may be added in a commonly used amount, preferably in an amount of 30 to 70 parts by weight, more preferably 30 to 50 parts by weight for aromatic amine curing agents and 30 to 120 parts by weight, more preferably 40 to 100 parts by weight for phenol resin and anhydride curing agents, both per 100 parts by weight of component (b).

The thermosetting resin compositions of the present invention may contain any well-known epoxy resins free of a double bond conjugated with an aromatic ring.

The thermosetting resin compositions of the present invention may further contain inorganic fillers if desired. The inorganic fillers may be blended in commonly used amounts, often ranging from 50 to 700 parts by weight, preferably from 100 to 400 parts by weight per 100 parts by weight of the total of components (a) and (b), while the identity of filler is not critical. They may be used either alone or in an admixture of two or more. Therefore, the type and amount of inorganic fillers may be suitably selected depending on a particular application of the thermosetting resin composition. Examples of the inorganic filler include natural silica including crystalline silica and amorphous silica, synthetic pure silica, synthetic spheroidal silica, talc, mica, silicon nitride, boron nitride, and alumina.

The composition of the present invention may further contain any desired additives, if desired, depending on its purpose and application. Acceptable additives include mold release agents such as waxes and fatty acids such as stearic acid and metal salts thereof, pigments, such as carbon black, dyes, antioxidants, flame retardants, and surface-treating agents such as γ-glycidoxypropyltrimethoxysilane. Further, epoxy resins, phenolic resins or amine curing agents may be additionally used if necessary and desirable.

The thermosetting resin composition may be prepared by combining and mixing predetermined amounts of the necessary components as previously mentioned, milling the mixture in a milling device preheated at 70° to 95° C., for example, a kneader, roll mill and extruder, cooling and comminuting. The order of blending the components is not critical.

The thermosetting resin compositions of the present invention are useful molding materials and powder coating materials and will find additional applications in the encapsulation of semiconductor devices such as IC, LSI, transistors, thyristors, and diodes and manufacture of printed circuit boards. For example, the composition may be transfer molded at a temperature of 150° to 200° C. and a pressure of 50 to 150 kgf/cm² for a time of 1 to 10 minutes, and post-cured at a temperature of 150° to 250° C.

EXAMPLE

Examples of the present invention are given below together with Comparative Examples by way of illustration and not by way of limitation. All parts and percents are by weight unless otherwise stated.

First, the synthesis of components used in Examples are described.

Synthesis 1

A four-necked flask equipped with a thermometer, agitator, dropping funnel and reflux condenser was charged with 134 grams (1 mol) of 2-propenylphenol and 56.8 grams (0.7 mol) of a formaldehyde aqueous solution (37%). To the flask was added 1.0 gram of NaOH. Reaction was conducted for 6 hours at reflux temperature in a nitrogen stream. Then 2.0 grams of oxalic acid and 100 grams of toluene were added to the reaction mixture, from which water was removed by heating for two hours. Thereafter, the reaction mixture was maintained at 150° C. for one hour for reaction. The reaction mixture was dissolved in methyl isobutyl ketone and washed with an aqueous Gauber's salt solution to remove the solvent forming the organic layer. There was obtained a reaction product A of the following structure having an OH equivalent of 153 and a softening point of 95° C. (yield 82%).

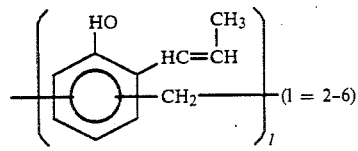

Synthesis 2

In a four-necked flask equipped with a thermometer, agitator, dropping funnel and reflux condenser, reaction product A resulting from Synthesis 1 was reacted with epichlorohydrin in the presence of NaOH according to a conventional procedure. There was obtained an epoxy compound designated reaction product B of the following structure having an epoxy equivalent of 215 and a softening point of 75° C. (yield 77%).

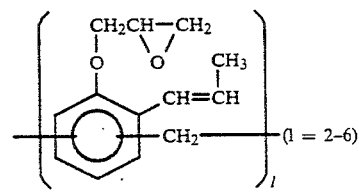

Synthesis 3

A four-necked flask equipped with a thermometer, agitator, dropping funnel and reflux condenser was charged with 134 grams (1 mol) of p-isopropenylphenol and 56.8 grams (0.7 mol) of a formaldehyde aqueous solution (37%). To the flask was added 1.0 gram of NaOH. Reaction was conducted for 6 hours at reflux temperature in a nitrogen stream. Then 2.0 grams of oxalic acid and 100 grams of toluene were added to the reaction mixture, from which water was removed by heating for two hours. Thereafter, the reaction mixture was maintained at 150° C. for one hour for reaction. The reaction mixture was dissolved in methyl isobutyl ketone and washed with an aqueous Gauber's salt solution to remove the solvent forming the organic layer. There was obtained reaction product C of the following structure having an OH equivalent of 155 and a softening point of 97° C. (yield 86%).

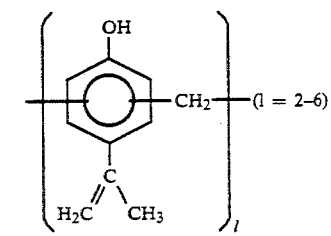

Synthesis 4

In a four-necked flask equipped with a thermometer, agitator, dropping funnel and reflux condenser, reaction product C resulting from Synthesis 3 was reacted with epichlorohydrin in the presence of NaOH according to a conventional procedure. There was obtained an epoxy compound designated reaction product D of the following structure having an epoxy equivalent of 217 and a softening point of 73° C. (yield 79%).

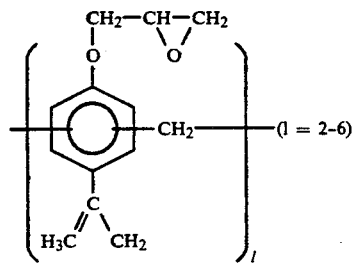

Synthesis 5

A four-necked flask equipped with a thermometer, agitator, dropping funnel and reflux condenser was charged with 200 grams of an o-cresol novolak epoxy resin having an epoxy equivalent of 200 and a softening point of 65° C. and 200 grams of toluene. With stirring at reflux temperature, 67 grams (0.5 mol) of 2-propenylphenol was added dropwise through the dropping funnel. Reaction was continued for 8 hours under reflux. Removal of the solvent yielded an epoxy compound designated reaction product E of the following structure having an epoxy equivalent of 536 and a softening point of 67° C. (yield 92%).

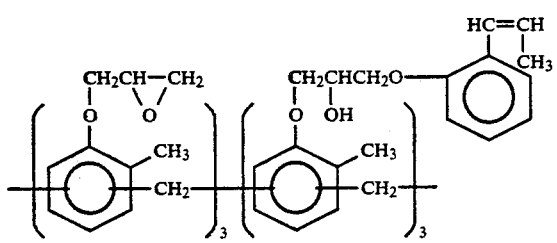

Synthesis 6

A four-necked flask equipped with a thermometer, agitator, dropping funnel and reflux condenser was charged with 200 grams of an o-cresol novolak epoxy resin having an epoxy equivalent of 200 and a softening point of 65° C. and 200 grams of toluene. With stirring at reflux temperature, 67 grams (0.5 mol) of p-isopropenylphenol was added dropwise through the dropping funnel. Reaction was continued for 8 hours under reflux. Removal of the solvent yielded an epoxy compound designated reaction product F of the following structure having an epoxy equivalent of 541 and a softening point of 69° C. (yield 94%).

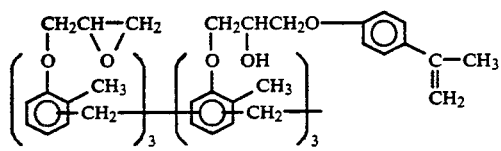

Synthesis 7

The procedure of Synthesis 1 was repeated except that 2-allylphenol was used. There was obtained a reaction product G of the following structure having an OH equivalent of 154 and a softening point of 93° C. (yield 81%).

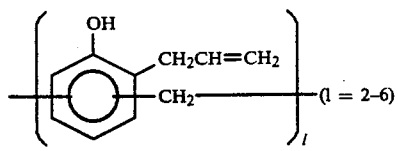

Synthesis 8

Reaction product G obtained in Synthesis 7 was epoxidized as in Synthesis 2. There was obtained an epoxy compound designated reaction product H of the following structure having an epoxy equivalent of 214 and a softening point of 77° C. (yield 79%).

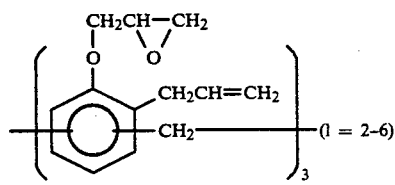

EXAMPLE 1-8 & COMPARATIVE EXAMPLES 1-7

To 100 parts of N,N'-4,4'-diphenylmethane bismaleimide were added reaction products A to H obtained in Synthesis examples, an epoxy resin, a phenol resin, and a curing catalyst in the amounts reported in Table 1. To the mixtures were further added 260 parts of quartz powder, 1.5 parts of γ-glycidoxypropyltrimethoxysilane, 1.5 parts of wax E, and 1.0 part of carbon black. The resulting blends were melt mixed in a hot twin roll mill until they became uniform. In this way, fifteen (15) thermosetting resin compositions (Examples 1 to 8 and Comparative Examples 1 to 7) were obtained.

These resin compositions were examined by the following tests.

[Spiral Flow]

Spiral flow was measured using a mold according to the EMMI standards at 175° C. under a pressure of 70 kg/cm².

[Mechanical Strength] (Flexural Strength and Flexural Modulus)

According to JIS K-6911, test base of 10×4×100 mm were prepared by molding for 2 minutes at 175° C. under a pressure of 70 kg/cm² and post curing for 4 hours at 220° C. The bars were measured for strength at 25° C. and 250° C.

[Glass Transition Temperature]

Using a dilatometer, test pieces having a diameter of 4 mm and a length of 15 mm were heated at a rate of 5° C./min.

[Crack Resistance]

A silicon chip dimensioned 9.0×4.5×0.5 mm was bonded to a 14PIN-IC frame of 42 alloy and encapsulated with a resin composition by molding at 175° C. for 2 minutes and post curing at 220° C. for 4 hours. The assembly was subjected to repetitive thermal cycle of −196° C./1 min. and 260° C./30 sec. The resin encapsulant was observed for crack occurrence at the end of 50 cycles. For each resin composition, 50 samples were tested.

[Al Electrode Deformation]

A deformation measuring element in the form of a silicon chip of 3.4×10.2×0.3 mm having an aluminum electrode evaporated thereon was bonded to a 14PIN-IC frame of 42 alloy and encapsulated with a resin composition by molding at 180° C. for 2 minutes and post curing at 220° C. for 4 hours. The assembly was subjected to repetitive thermal cycles of −196° C./1 min. and 260° C./30 sec. The deformation of the aluminum electrode was measured at the end of 200 cycles. For each resin composition, 3 samples were tested.

[Moisture Resistance]

Samples were molded from a resin composition to a 14 pin DIP IC configuration and placed in a high pressure oven at 121° C. and humidity 100% for 100 hours. Those samples in which aluminum wirings were exposed were rejected. Percent rejection was calculated.

The results of these tests are also shown in Table 1.

TABLE 1

| | Examples | | | | | | | |
|---|---|---|---|---|---|---|---|---|
| | 1 | 2 | 3 | 4 | 5 | 6 | 7 | 8 |
| Ingredient | | | | | | | | |
| N,N'-4,4'-diphenyl-methanebismaleimide (parts by weight) | 100 | 100 | 100 | 100 | 100 | 100 | 100 | 100 |
| Reaction product (parts by weight) | B 100 | D 100 | E 100 | F 100 | B 50 | B 100 | D 100 | E 100 |
| Epoxy resin* (parts by weight) | — | — | — | — | 50 | — | — | — |
| Phenol resin** (parts by weight) | 51 | 51 | 21 | 21 | 51 | — | — | — |
| Triphenyl phosphine (parts by weight) | 1.0 | 1.0 | 0.6 | 0.6 | 1.0 | 1.0 | 1.0 | 1.0 |
| Dicumyl peroxide (parts by weight) | 0.4 | 0.4 | 0.2 | 0.2 | 0.4 | 0.4 | 0.4 | 0.4 |
| Properties | | | | | | | | |
| Spiral flow (inch) | 21 | 22 | 21 | 23 | 20 | 22 | 21 | 23 |
| Flexural strength (25° C. kg/mm$^2$) | 14.5 | 13.2 | 14.0 | 14.2 | 13.7 | 14.1 | 14.0 | 13.8 |
| Flexural strength (250° C. kg/mm$^2$) | 4.1 | 4.0 | 3.9 | 4.2 | 4.0 | 4.2 | 4.1 | 4.2 |
| Flexural modulus (kg/mm$^2$) | 1450 | 1410 | 1520 | 1430 | 1400 | 1450 | 1480 | 1410 |
| Glass transition temperature (°C.) | 260 | 257 | 261 | 254 | 258 | 256 | 249 | 258 |
| Crack resistance (%) | 0 | 0 | 0 | 0 | 0 | 0 | 0 | 0 |
| Al electrode deformation (μm) | 0 | 0 | 0 | 0 | 0 | 0 | 0 | 0 |
| Moisture resistance (%) | 0 | 0 | 0 | 0 | 0 | 0 | 0 | 0 |

| | Comparative Examples | | | | | | |
|---|---|---|---|---|---|---|---|
| | 1 | 2 | 3 | 4 | 5 | 6 | 7 |
| Ingredient | | | | | | | |
| N,N'-4,4'-diphenyl-methanebismaleimide (parts by weight) | 100 | — | 100 | 100 | 100 | 100 | 100 |
| Reaction product (parts by weight) | — | — | — | A*** 72 | A*** 72 | G*** 72 | H 100 |
| Epoxy resin* (parts by weight) | — | 100 | 100 | — | — | — | — |
| Phenol resin** (parts by weight) | — | 55 | 55 | — | 50 | 51 | 1.0 |
| Triphenyl phosphine (parts by weight) | 1.0 | 1.0 | 1.0 | 1.0 | 1.0 | 1.0 | 1.0 |
| Dicumyl peroxide (parts by weight) | 0.4 | — | 0.4 | 0.4 | 0.4 | 0.4 | 0.4 |
| Properties | | | | | | | |
| Spiral flow (inch) | 3 | 22 | 21 | 5 | 19 | 21 | 22 |
| Flexural strength (25° C. kg/mm$^2$) | 14.2 | 14.0 | 13.9 | 14.5 | 13.9 | 8.1 | 6.2 |
| Flexural strength (250° C. kg/mm$^2$) | 4.1 | 1.2 | 1.4 | 2.2 | 2.1 | 0.9 | 0.7 |
| Flexural modulus (kg/mm$^2$) | 1510 | 1520 | 1480 | 1450 | 1470 | 1350 | 1320 |
| Glass transition temperature (°C.) | 260 | 165 | 190 | 235 | 210 | 198 | 190 |
| Crack resistance (%) | 80 | 100 | 90 | 95 | 84 | 100 | 100 |
| Al electrode deformation (μm) | 0 | 3.0 | 1.2 | 0.9 | 0.8 | 1.2 | 1.5 |
| Moisture resistance (%) | 50 | 0 | 40 | 100 | 100 | 100 | 75 |

*: EOCN1020 (65) by Nihon Kayaku K.K.
**: TD2093 by Dai-Nihon Ink Chemical K.K.
***: Modified phenol resin As seen from Table 1, thermosetting resin compositions containing an N-substituted maleimide group-containing compound in admixture with an epoxy resin having a double bond conjugated with an aromatic ring (Examples 1-8) have a high glass transition temperature, increased flexural strength at high temperature, crack resistance, and moisture resistance compared with thermosetting resin compositions which contain either one or neither of these components (Comparative Examples 1-7).

There have been described thermosetting resin compositions which are relatively stress free, well bondable and well workable, and cure into heat resistant products which maintain mechanical strength and water resistance at high temperatures. The present resin compositions meet the requirements for advanced thermosetting resins and find use as various electrical insulating materials, structural materials, adhesives, powder coating materials, and semiconductor encapsulating materials.

Although some preferred embodiments have been described, many modifications and variations may be made thereto in the light of the above teachings. It is therefore to be understood that within the scope of the appended claims, the invention may be practiced otherwise than as specifically described.

We claim:

1. A thermosetting resin composition comprising in an admixture,
   (a) a maleimide compound having in the molecule thereof, at least one N-substituted maleimide group and
   (b) an epoxy novolak resin having a double bond conjugated with an aromatic ring synthesized from epichlorohydrin and a novolak resin, said double bond conjugated with an aromatic ring represented by the following formula:

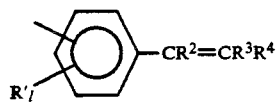

wherein R' is selected from the group consisting of a hydrogen atom, a halogen atom, a halogen-substituted or unsubstituted alkyl group having 1 to 6 carbon atoms, and a glycidoxy group, $R^2$, $R^3$ and $R^4$ are independently selected from a hydrogen atom or an alkyl group having 1 to 4 carbon atoms, and l is an integer of 1 to 3.

2. The composition of claim 1 wherein the maleimide compound (a) has the general formula:

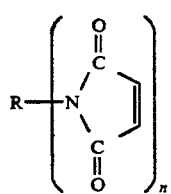

(I)

wherein R is an n-valent organic group and n is an integer of 1 to 20.

3. The composition of claim 2 wherein n is an integer of 1 to 6.

4. The composition of claim 2 wherein n is 2.

5. The composition of claim 2 wherein R is selected from the group consisting of

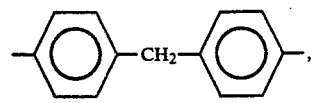

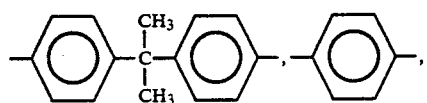

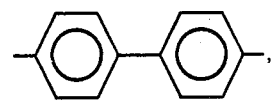

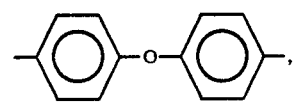

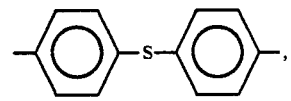

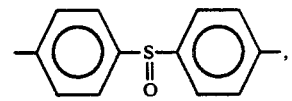

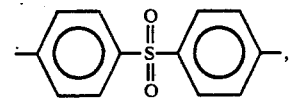

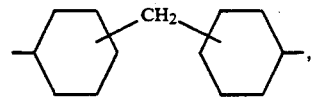

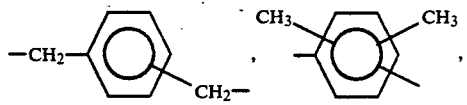

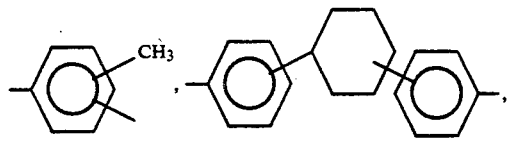

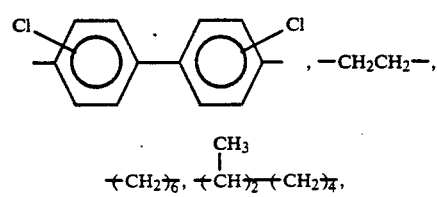

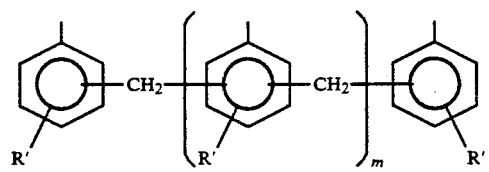

wherein R' is a hydrogen atom, a $C_{1-4}$ alkyl group or a halogen atom, and m is an integer of from 0 to 18.

6. The composition of claim 1 wherein the maleimide compound (a) is N,N'-diphenylmethane bismaleimide.

7. The composition of claim 1 wherein the maleimide compound (a) is an N,N'-bismaleimide selected from the group consisting of
N,N'-diphenylmethane bismaleimide,
N,N'-phenylene bismaleimide,
N,N'-diphenyl ether bismaleimide,
N,N'-diphenyl sulfone bismaleimide,
N,N'-dicyclohexylmethane bismaleimide,
N,N'-xylene bismaleimide,
N,N'-tolylene bismaleimide,
N,N'-xylylene bismaleimide,
N,N'-diphenylcyclohexane bismaleimide,
N,N'-dichlorodiphenyl bismaleimide,
N,N'-(2,2-diphenylpropane) bismaleimide,
N,N'-diphenyl ether bismaleimide,
N,N'-diphenyl sulfone bismaleimide,
N,N'-ethylene bismaleimide,
N,N'-hexamethylene bismaleimide and
N,N'-(dimethylhexamethylene) bismaleimide.

8. The composition of claim 1 wherein the maleimide compound (a) is a compound represented by the following formula:

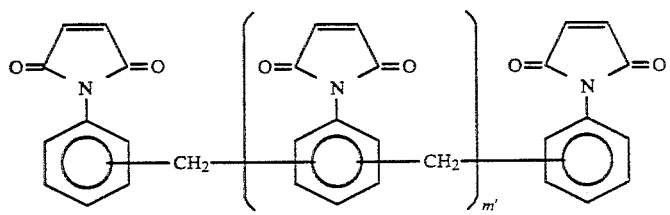

wherein m' is an integer of 0 to 18.

9. The composition of claim 1 wherein the double bond conjugated with an aromatic ring is selected from the group consisting of

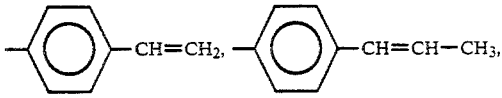

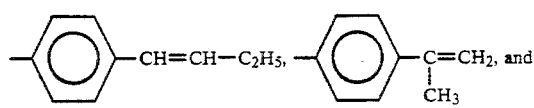

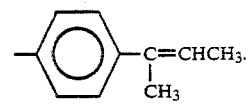

10. The composition of claim 1, wherein said epoxy novolak resin is selected from the group consisting of

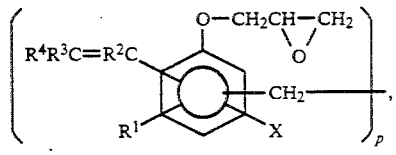

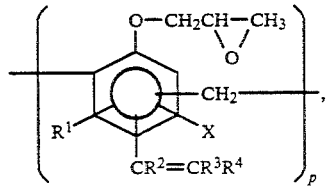

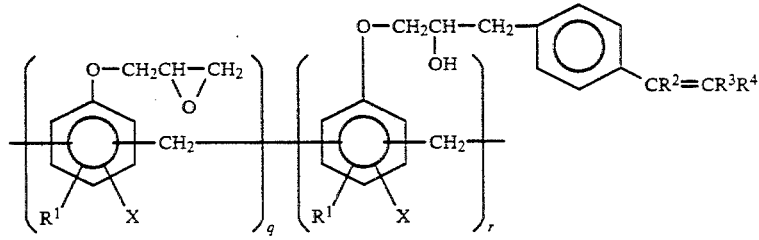

and

-continued

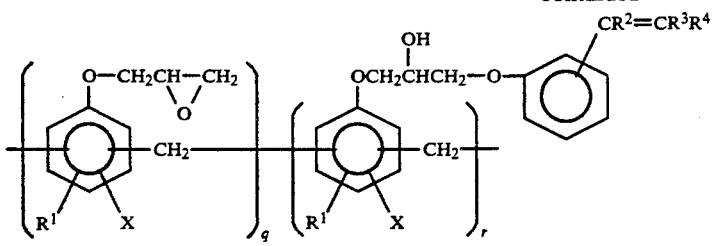

wherein $R^1$ is a hydrogen atom or a monovalent hydrocarbon group having 1 to 6 carbon atoms, X is a hydrogen atom or a halogen atom, p, q and r are each a positive integer of from 1 to 20 and the sum of $q+r$ is equal to an integer of from 2 to 20, and $R^2$, $R^3$ and $R^4$ are independently selected from a hydrogen atom or an alkyl group having 1 to 4 carbon atoms.

11. The compositions of claim 1 wherein said epoxy novolak resin is selected from the group consisting of

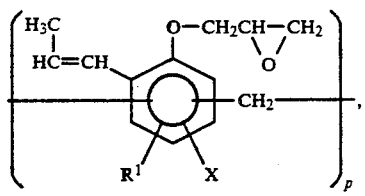

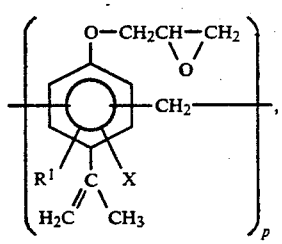

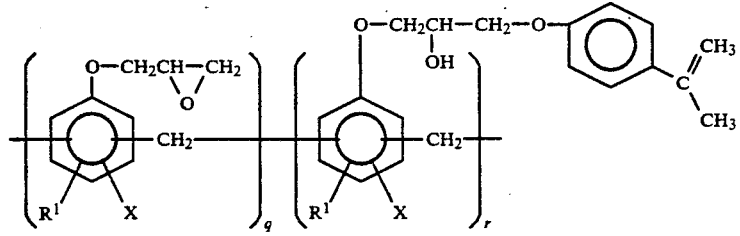

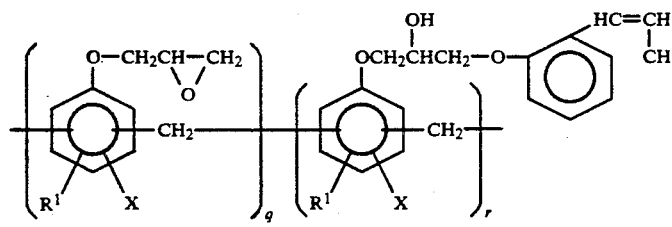

wherein $R^1$ is a hydrogen atom or a monovalent hydrocarbon group having 1 to 6 carbon atoms, X is a hydrogen atom or a halogen atom, p, q and r are each a positive integer of from 1 to 20 and the sum of $q+r$ is equal to an integer of from 2 to 20, and $R^2$, $R^3$ and $R^4$ are independently selected from a hydrogen atom or an alkyl group having 1 to 4 carbon atoms.

12. The composition of claim 1, which comprises 100 parts by weight of component (a) and 20 to 400 parts by weight of component (b).

13. A cured product obtain by curing the composition of claim 1.

* * * * *